(12) United States Patent
De Gaillard

(10) Patent No.: US 6,783,172 B2
(45) Date of Patent: Aug. 31, 2004

(54) ROOF STRUCTURE OF A MOTOR VEHICLE

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/260,543

(22) Filed: Oct. 1, 2002

(65) Prior Publication Data
US 2003/0075948 A1 Apr. 24, 2003

(30) Foreign Application Priority Data
Oct. 1, 2001 (DE) .......................................... 101 48 537

(51) Int. Cl.[7] ................................................. B60J 7/047
(52) U.S. Cl. .............................. 296/193.04; 296/146.8; 296/220.01; 296/216.03
(58) Field of Search ....................... 296/193.04, 216.01, 296/216.03, 220.01, 223, 146.8, 197

(56) References Cited

U.S. PATENT DOCUMENTS

| | | | |
|---|---|---|---|
| 4,801,174 A | | 1/1989 | Hirshberg et al. |
| 5,538,312 A | * | 7/1996 | Lehmkuhl ................. 296/97.22 |
| 5,769,481 A | * | 6/1998 | Cooper ..................... 296/97.22 |
| 6,279,989 B1 | | 8/2001 | Marchart et al. |

FOREIGN PATENT DOCUMENTS

| | | | |
|---|---|---|---|
| DE | 199 08 253 A1 | 9/2000 | |
| DE | 199 49 468 A1 | 4/2001 | |
| FR | 2 744 957 A1 | 8/1997 | |
| JP | 362265020 | * 11/1987 | ............ 296/216.03 |
| JP | 402141328 | * 5/1990 | ............ 296/216.03 |

* cited by examiner

*Primary Examiner*—Dennis H. Pedder
(74) *Attorney, Agent, or Firm*—Nixon Peabody LLP; David S. Safran

(57) ABSTRACT

A roof structure of a motor vehicle with a movable front cover mechanism for closing or at least partially clearing a front roof opening and with a rear hatch or rear window which is connected to the front cover mechanism and which can be swiveled up around its front edge for clearing a rear roof opening. The front cover mechanism is supported on a module frame which is assigned to the front roof opening and which is attached to the body-mounted roof frame. On a rear transverse frame part of the module frame is a swivel bearing mechanism for permitting the swiveling up and down of the rear hatch or rear window.

13 Claims, 6 Drawing Sheets

ROOF STRUCTURE OF A MOTOR VEHICLE

BACKGROUND OF THE INVENTION

1. Field of the Invention

The invention relates to a roof structure of a motor vehicle with a movable front cover mechanism for closing or at least partially clearing a front roof opening and with a rear hatch or rear window which is connected to the front cover mechanism and which can be swiveled up around its front edge for clearing a rear roof opening.

2. Description of the Related Art

German Patent Publication DE 199 08 253 A1 discloses a body structure for a motor vehicle which has a motor vehicle roof with a front cover element and a rear cover element. The front cover element can be pushed over the rear cover element on roof-mounted guides to clear the front roof opening. To clear the rear roof opening, the rear cover element which is pivotally supported on its front edge can be raised with its rear edge.

German Patent Publication DE 199 49 468 A1 discloses a motor vehicle roof with a roof module on a module frame of which a transparent sliding cover is movably supported in the lengthwise direction of the roof and can be pushed to the rear under a rear window which adjoins within the module frame in order to clear the front part of the roof opening. The rear window is pivotally mounted on its front edge on the module frame so that it can be raised with its rear edge into the ventilation position. The roof module is pushed into the motor vehicle during installation through the front window opening and attached from underneath to the roof frame of the motor vehicle.

SUMMARY OF THE INVENTION

The object of the invention is to devise the initially-mentioned roof structure which is simple to build and install, and which can be adjusted into ventilation positions and is intended for attachment to the motor vehicle roof in different versions.

This object as well as others is achieved in accordance with the present invention in the aforementioned roof structure by the front cover mechanism being supported on a module frame which is assigned to the front roof opening and which is attached to the body-mounted roof frame, and on its rear transverse frame part has a swivel bearing mechanism for a rear hatch or rear window which extends from the module frame to the rear. Since the supports and guides for the cover mechanism and the rear hatch or rear window are located on the module frame, it can be pre-mounted as a unit with the cover mechanism so that final installation on the vehicle can proceed much more quickly. The rear hatch or rear window can be either part of the pre-mounted unit or can be attached later to the support on the module frame.

Preferably a cover, especially a glass cover, forms the front cover mechanism which can be moved to the rear over the rear window in the open position in which at least its rear edge is raised.

In the situation in which the cover is especially a raisable spoiler cover which can be moved to the rear, there need be no guides for the cover on the side roof members on the outside which would otherwise be necessary when the cover is guided externally.

In one alternative embodiment, a louvered roof which encompasses at least two raisable and movable louvers forms the front cover mechanism, the louvers being feasibly glass louvers.

When the module frame contains a blocking mechanism with which swiveling-up of the rear window can be prevented or the swiveling angle of the rear window can be limited, reliable operation of the rear hatch or the rear window is ensured.

One embodiment of the roof structure is detailed below with reference to the drawings.

DETAILED DESCRIPTION OF THE INVENTION

Figure 1:
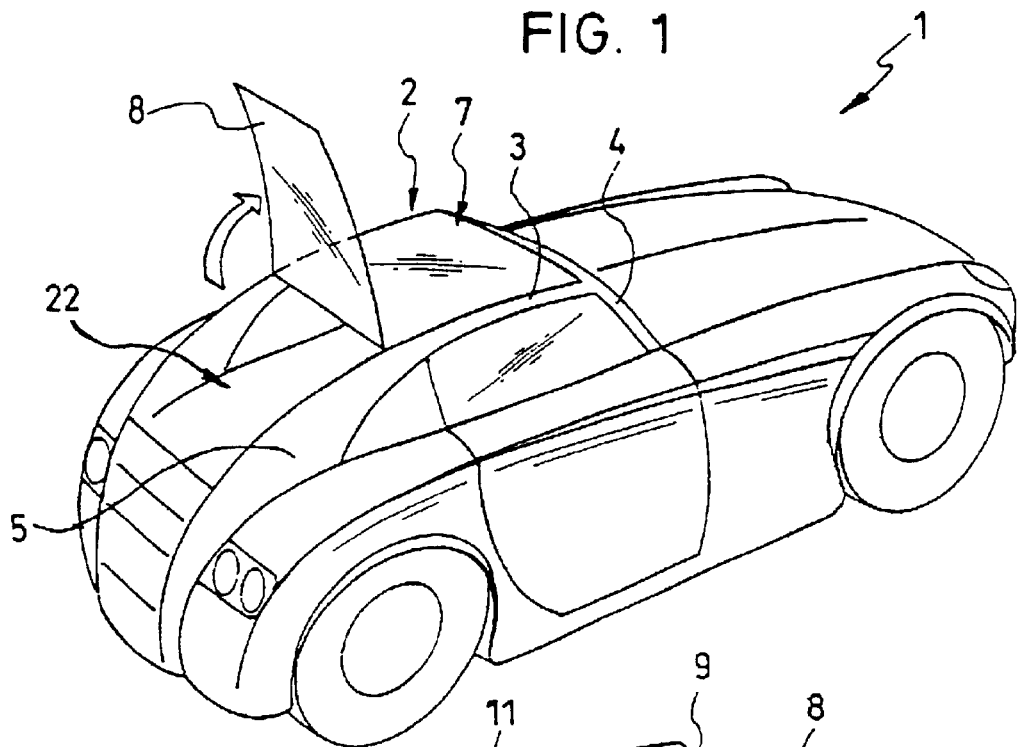
FIG. 1 in a perspective overhead view shows a motor vehicle with a front closed cover and a back swiveled-up rear window.
Figure 2:
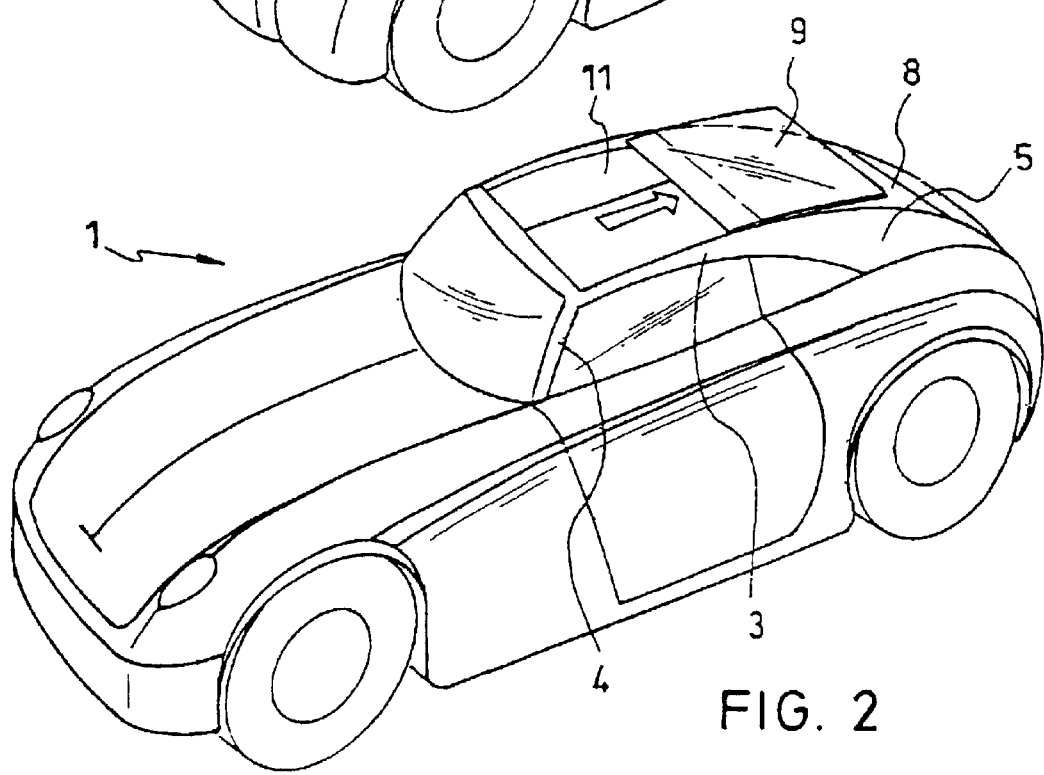
FIG. 2 in a perspective side view shows the motor vehicle with a closed rear window and the opened cover.
Figure 3:
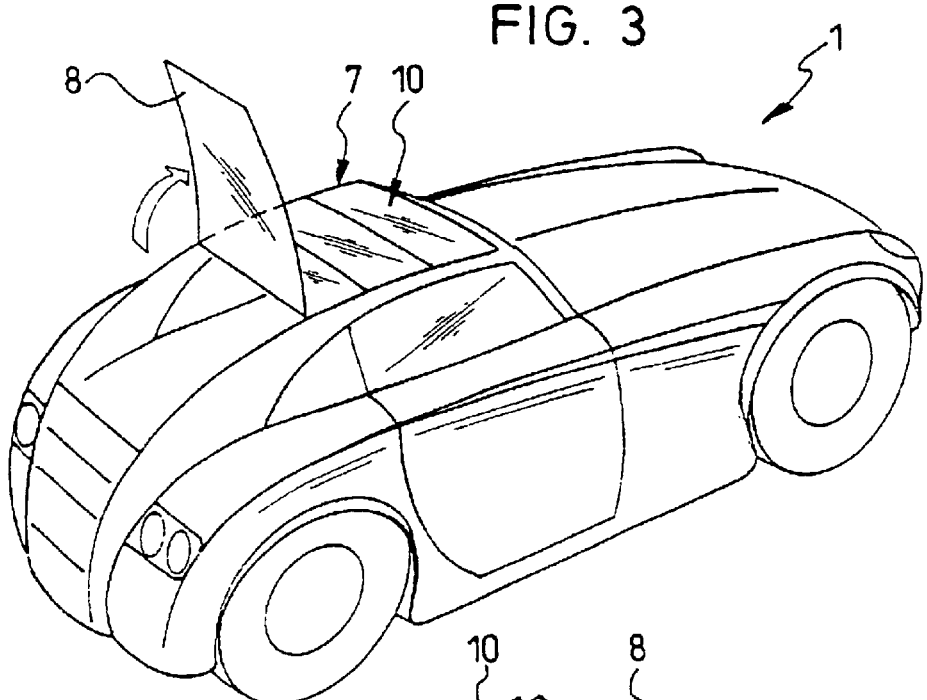
FIG. 3 in a perspective overhead view shows the motor vehicle with the front closed cover and a back swiveled-up rear window.
Figure 4:
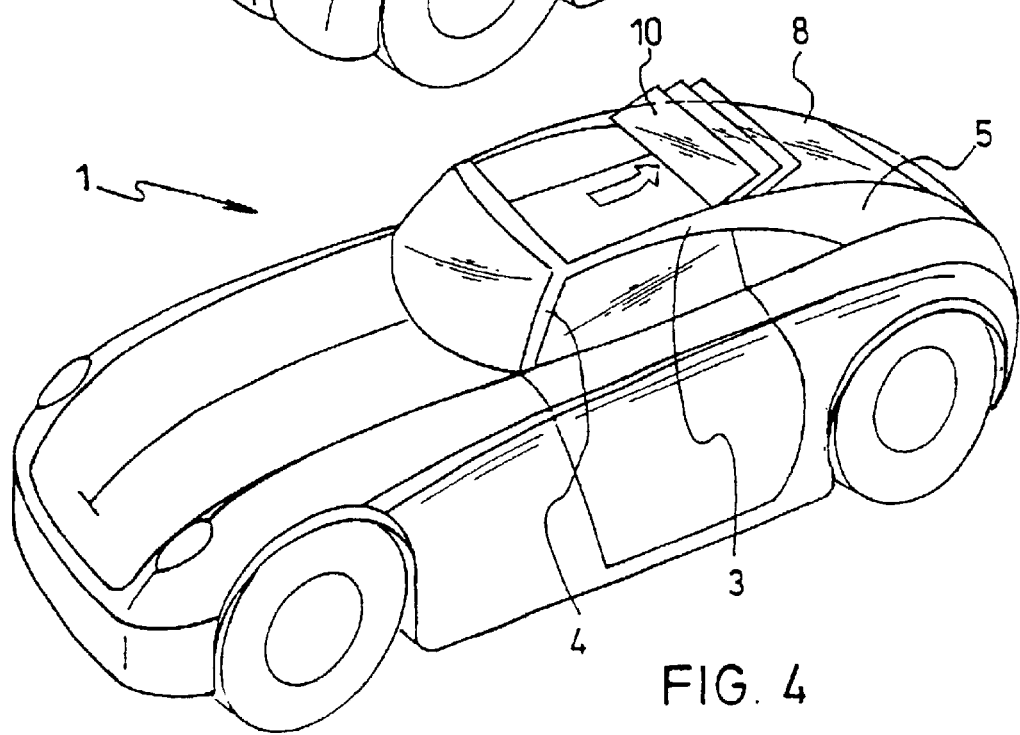
FIG. 4 in a perspective side view shows a motor vehicle with a closed rear window and opened cover.

As shown in FIGS. 1 and 2, a motor vehicle 1, in the embodiment a two-door coupe, contains a roof structure 2 with side lengthwise roof members 3 which adjoin the A columns 4 to the front and pass into the C columns 5 to the rear or assume their function. Between the two lengthwise roof members 3 which can be stiffened by a cross brace 6 (see FIG. 5) there are a front cover means 7 and a swiveling rear window 8. The front cover means 7 is, for example, a cover 9 of a spoiler roof, or a louvered roof 10 (see FIGS. 3 and 4) with which a front roof opening 11 can be selectively closed or at least partially cleared.

Figure 5:
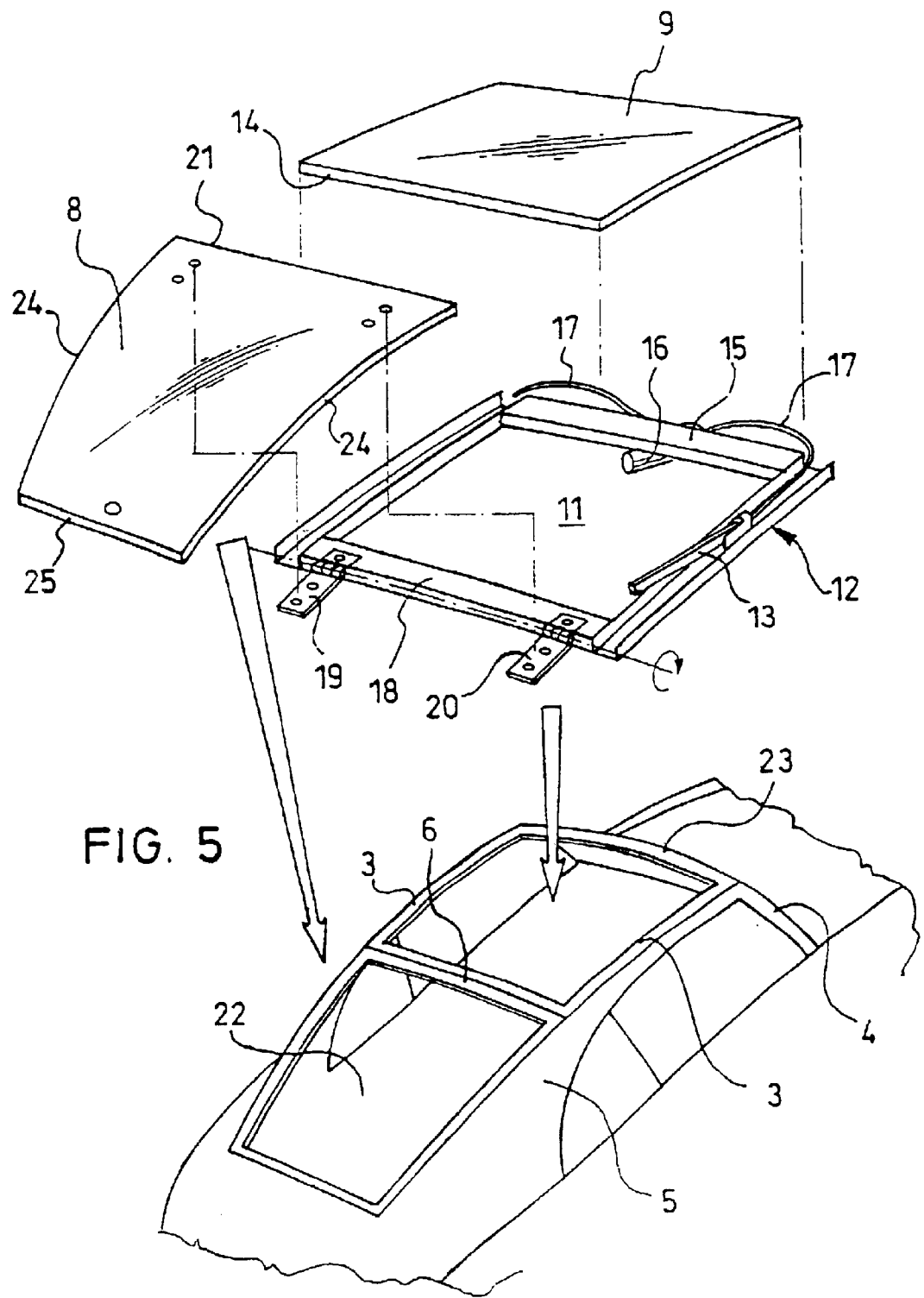
FIG. 5 in a perspective overhead view, exploded, shows the raw body of a motor vehicle with a roof structure as claimed in the invention with a module frame.

The front cover means 7 or the cover 9 is supported on the module frame 12 by way of side bearing means 13 (only the right bearing means 13 is shown in FIG. 5) and can be raised into a ventilation position with the raised rear edge 14 of the cover, and with the raised rear edge 14 can be moved to the rear in the manner of a spoiler roof for clearing the front roof opening 11. One such bearing means is described for example in WO 00/41835 so that reference is made to this document for a more detailed explanation of this sample bearing means 13.

On the module frame 12, for example, on the front transverse frame part 15 of the module frame 12, a drive motor 16 is attached which is connected via one drive cable 17 at a time to the bearing means 13 and moves them for raising and moving the cover 9. On the rear transverse frame part 18 of the module frame 12 there is a swivel bearing means 19, 20 for the rear window 8 which has two hinges 19 and 20 which are connected to the rear window 8 in the area of its front edge 21 and for permitting the swiveling up and down of the rear window 8.

The module frame 12 is a prefabricated unit which contains the front cover means 7 or the cover 9 for the front roof opening 11 and the swiveling rear window 8 which covers the rear roof opening 22 as well as the bearing means 13 and a drive means 16, 17 for the selectively moving the front cover 9. The modular frame 12 is attached to the lengthwise roof members 3, and if necessary, to the apron 23 and well as to the cross brace 6. Sealing of the rear window 8 takes place on the front edge 21 of the rear window 8 via a seal attached to the module frame 12 and on its side edges 24 and on the rear edge 25 via a seal attached to the corresponding body-mounted roof frame parts or via a peripheral seal which is attached to a seal frame which extends around the rear roof opening 22 and which is attached to the body mounted roof frame parts.

Figure 6:
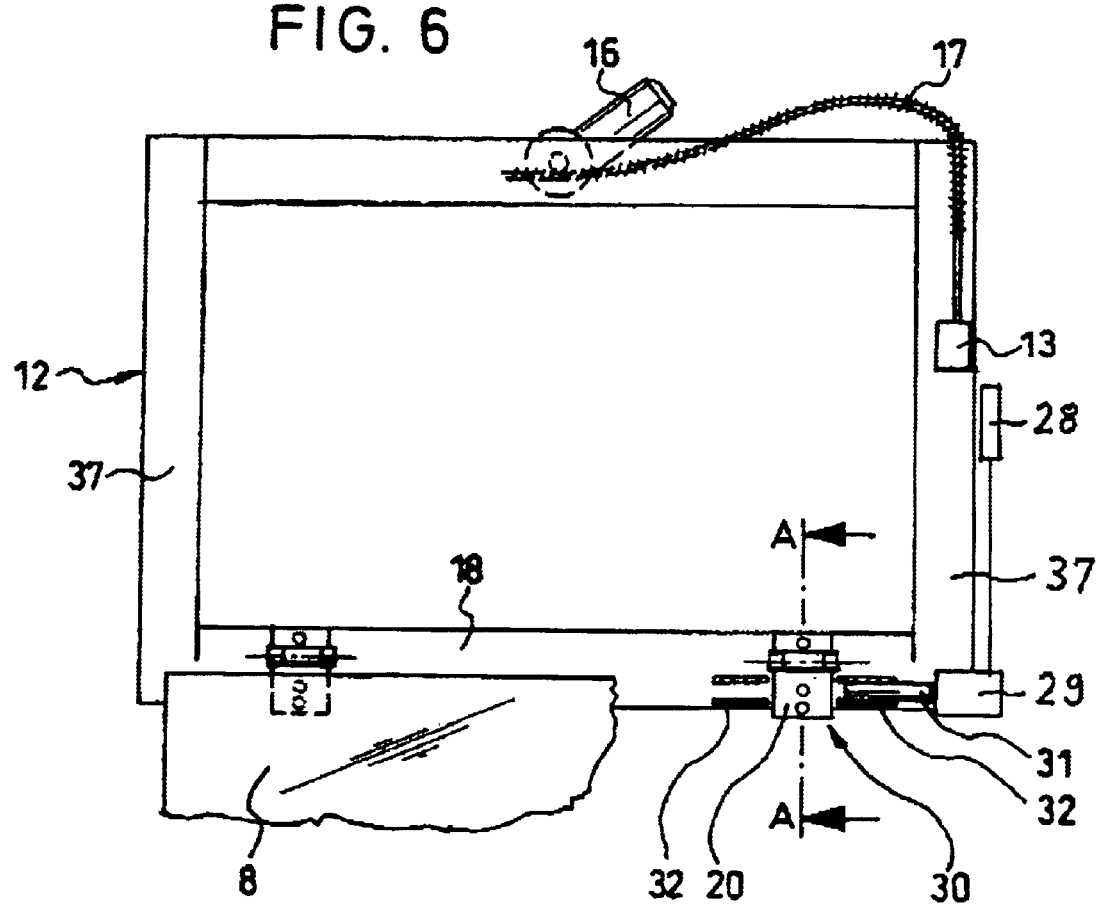
FIG. 6 in a top view in a schematic shows the module frame.
Figure 7:
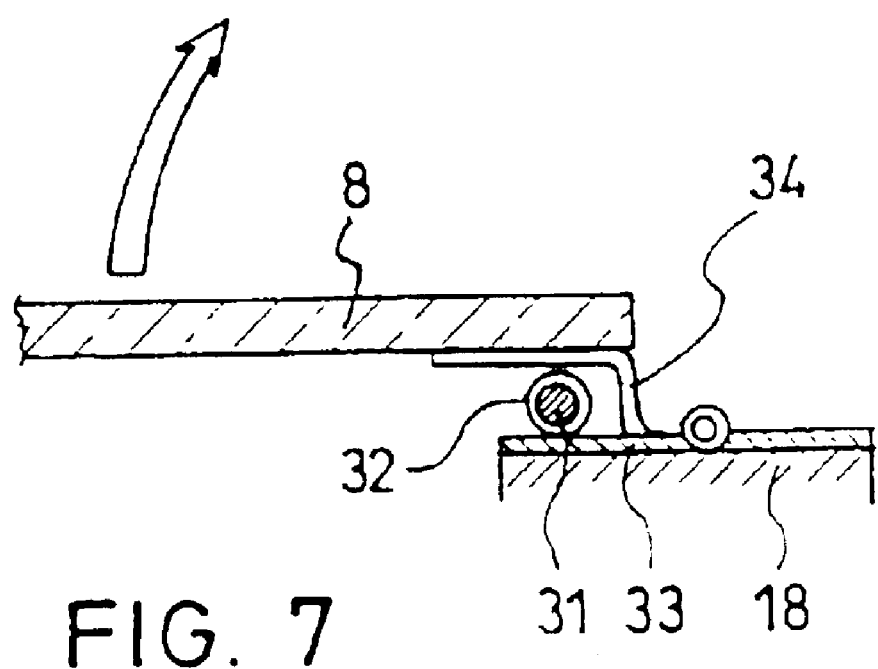
FIG. 7 shows in a sectional view the module frame along line A—A in FIG. 6.
Figure 8:
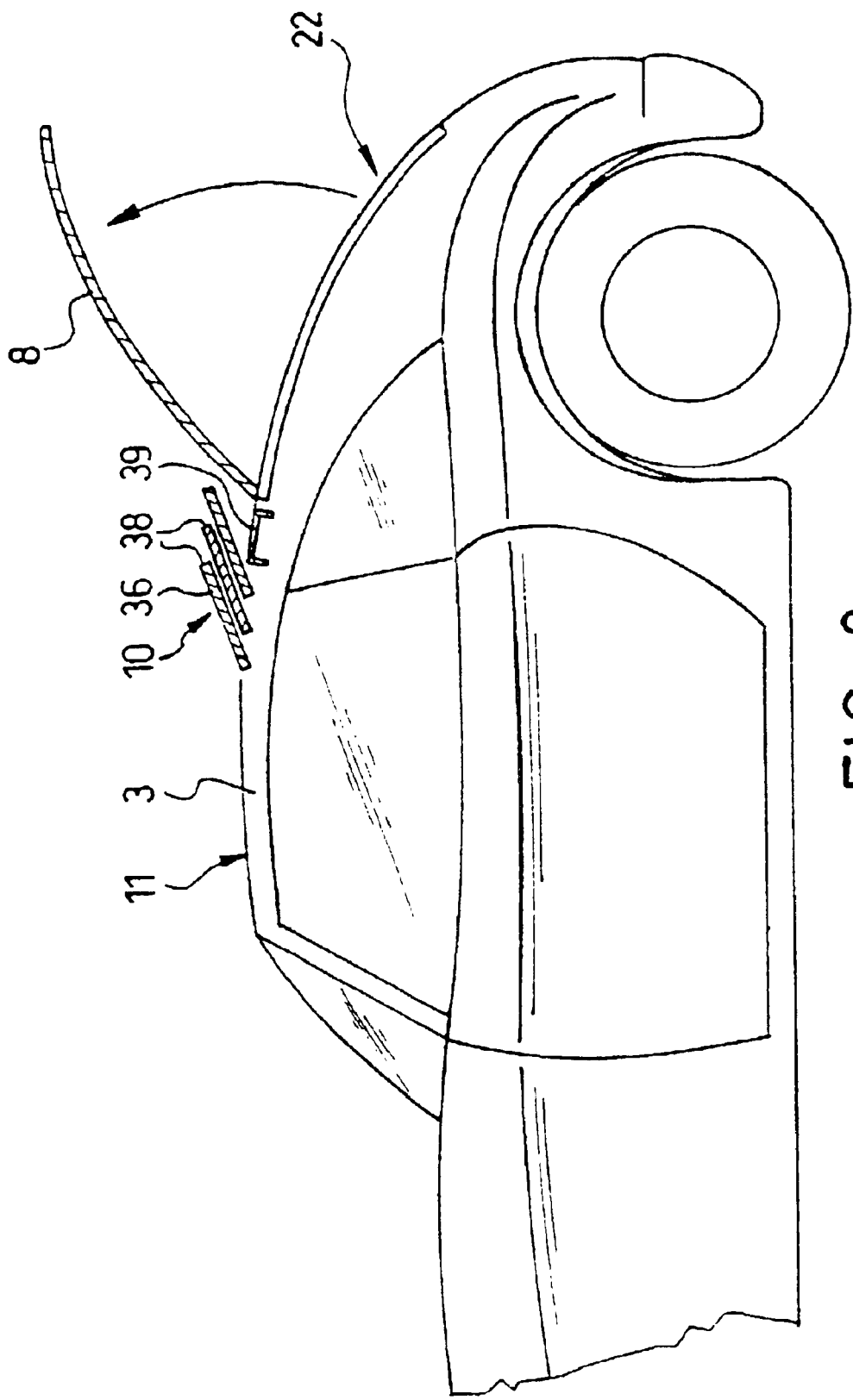
FIG. 8 shows in a side view a motor vehicle with the roof structure as claimed in the invention which contains a louvered roof for the front roof opening.

As shown in FIGS. 6 and 7, on the module frame there can furthermore be a blocking means 30 by which the swiveling up of the rear window 8 can be blocked. The blocking means 30 contains a lock pin 31 which is located on the module frame 12 next to the hinge 20 and is movably supported on a guide 32 so that it is located in the extended blocking position (FIG. 7) in front of or over a tongue 33 of the movable hinge part 34, and thus, can prevent the swiveling-up of the tongue 33 and of the hinge part 34, and thus, the rear window 8. In its retracted position, the lock pin 31 allows the rear window 8 to be swiveled up (see FIG. 6).

The lock pin 31 can be located in its blocking position with a certain distance over the tongue 33 so that a limited swiveling angle of the hinge part 34 or the rear window 8 is allowed until the tongue 33 strikes the lock pin 31 and its further swiveling motion is blocked.

Actuation of the blocking means 30 or the lock pin 31 takes place via the drive cable 17 for the bearing means 13 which is permanently connected on its elongated trailing end 35 to the lock pin 31 or can be coupled to it or via some other coupling to the movable cover 9 or the cover means 7. The blocking means 30 can be designed for the swivel bearing means or for only one of the hinges 19, 20, singly with a lock pin 31 or in duplication for each of the hinges 19, 20.

In one alternative embodiment, instead of the mechanically triggered actuation of the blocking means 30, there can also be sensor activation in which a sensor 28 detects the position of the front cover and depending on the corresponding sensor signal controls an electromagnet 29 which actuates the lock pin 31 or another locking element. The blocking means 30 can also act on a lock with which the rear window 8 can be locked on its bottom end on the body.

The louvered roof 10, which in one alternative embodiment forms the cover means 7 for the front roof opening 11, contains at least two louvers, especially glass louvers. The basic structure of the louvered roof is described in German Patent Publication DE 196 08 916 C1 or EP 0 978 400 A2, to which reference is made for further explanation. The louvers 36 can each move on a guide rail on the lateral frame part 37 of the module frame 12 and are supported to be raisable with their rear edge 38. When the louvered roof 10 borders the rear window 8 to the back and when the louvered roof 10 is opened the raised rear louver 36 extends over the rear window 8, the rear window 8 can likewise be blocked against opening by the blocking means 30. On the other hand, the rear transverse frame part 18 of the module frame 12 can have an outside roof skin section 39 with a width which is greater in the lengthwise direction of the roof so that the front roof opening 11 and the rear roof opening 22 are spaced farther apart from one another, in contrast to the examples shown in FIGS. 1 to 4. In this way, with the louvered roof 10 opened, in which the rear louver 36 projects to the rear over the front roof opening 11, the rear window 8 can be swiveled up without the danger of collision.

The rear window 8 which can be formed as a rear hatch with a frame can be held in the swiveled-up end position or in the intermediate position by means of a spring-damper element (not shown). The spring-damper element is feasibly attached to the swivel bearing means for the rear window 8 and thus also to the module frame 12.

Thus, the module frame 12 is prepared as a prefabricated unit selectively with a front cover 9 or with a front louvered roof 10 and with a rear window 8 or rear hatch which is pivotally mounted on the module frame 12 for mounting on the body-mounted roof frame.

What is claimed is:

1. A roof structure of a motor vehicle comprising:
a body-mounted roof frame forming a front roof opening and a rear roof opening;
a module frame attached to said body-mounted roof frame and assigned to said front roof opening said module frame including a rear transverse frame part;
a front cover supported on said module frame selectively movable to close or at least partially clear said front roof opening; and
a rear hatch adjoining the front cover and extending from a rear of the module frame, said rear hatch including a front edge and adapted to be swiveled up around said front edge for clearing said rear roof opening, wherein the modular frame includes a swivel bearing means mounted on said rear transverse frame part for permitting swiveling up and down of the rear hatch.

2. The roof structure as claimed in claim 1, wherein the front cover comprises a glass cover that is selectively moveable rearwardly over the rear hatch in an open position in which at least its rear edge is raised.

3. The roof structure as claimed in claim 1, wherein the glass cover include a raisable spoiler cover which can moved to the rear.

4. The roof structure as claimed in claim 1, wherein the front cover comprises a louvered roof which includes at least two raisable and movable louvers.

5. The roof structure as claimed in claim 1, wherein the module frame is attached to lengthwise roof members of the motor vehicle.

6. The roof structure as claimed in claim 5, wherein the module frame includes a bearing means for the front cover and a drive means for selectively moving the front cover.

7. The roof structure as claimed in claim 6, wherein the module frame includes a blocking means with which swiveling-up of the rear window can be prevented or the swiveling angle of the rear window can be limited.

8. The roof structure as claimed an claim 7, wherein the blocking means is coupled to the drive means.

9. The roof structure as claimed in claim 7, wherein the blocking means is automatically actuated by way of a sensor.

10. The roof structure as claimed in claim 9, wherein the blocking means is provided with means for the activation thereof depending on the position of the front cover.

11. The roof structure as claimed in claim 10, wherein the blocking means has a movable lock part for blocking engagement on the swivel bearing means.

12. The roof structure as claimed in claim 11, wherein the module frame has a rear transverse roof part that forms a roof skin section which separates the front roof opening from the rear roof opening.

13. The roof structure as claimed in claim 4, wherein when the louvered roof is in an open position the rear louver is located above a roof skin section without hindering the swiveling capacity of the rear hatch.

* * * * *